United States Patent
Simon et al.

(10) Patent No.: US 10,319,120 B2
(45) Date of Patent: Jun. 11, 2019

(54) METHOD AND COMPUTER PROGRAM PRODUCT FOR GENERATING A HIGH RESOLUTION 3-D VOXEL DATA RECORD BY MEANS OF A COMPUTER

(71) Applicant: Universität Stuttgart, Stuttgart (DE)

(72) Inventors: Sven Simon, Ludwigsburg (DE);
Steffen Kieß, Schorndorf (DE); Jürgen Hillebrand, Stuttgart-Vahingen (DE);
Jajnabalkya Guhathakurta, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 41 days.

(21) Appl. No.: 15/183,186

(22) Filed: Jun. 15, 2016

(65) Prior Publication Data
US 2017/0018098 A1    Jan. 19, 2017

(30) Foreign Application Priority Data
Jun. 19, 2015    (DE) .................. 10 2015 007 939

(51) Int. Cl.
*G06K 9/00*      (2006.01)
*G06T 11/00*     (2006.01)
*G06T 17/00*     (2006.01)

(52) U.S. Cl.
CPC .......... *G06T 11/008* (2013.01); *G06T 11/00* (2013.01); *G06T 11/005* (2013.01); *G06T 17/00* (2013.01); *G06T 2207/10081* (2013.01); *G06T 2211/421* (2013.01); *G06T 2211/436* (2013.01)

(58) Field of Classification Search
None
See application file for complete search history.

(56) References Cited

U.S. PATENT DOCUMENTS

| | | | |
|---|---|---|---|
| 2007/0052700 A1* | 3/2007 | Wheeler | ............... G06T 7/0012 345/419 |
| 2008/0205717 A1* | 8/2008 | Reeves | ................. G06T 7/0012 382/128 |
| 2008/0240335 A1 | 10/2008 | Manjeshwar et al. | |
| 2013/0083886 A1 | 4/2013 | Carmi et al. | |

(Continued)

OTHER PUBLICATIONS

Kiess, S. [et al.]: Computed Tomography Resolution Enhancement by Integrating High-Resolution 20 X-Ray Images Into the CT Reconstruction. Abstract for the conference "Digital Industrial Radiology and Computed Tomography" presenting in Ghent Poster, URL: http:llwww.ndt.netleventsiDIR20151applcontentltopic.php?eventiD=29&TopiciD=2462, online from May 17, 2015, [searched on Jan. 20, 2016], 2 pages.

(Continued)

*Primary Examiner* — Wei Wen Yang
(74) *Attorney, Agent, or Firm* — Banner & Witcoff, Ltd.

(57) ABSTRACT

The present invention relates to a method and a computer program product for generating a high-resolution three-dimensional (3D) voxel data set of an object. The high-resolution three-dimensional (3D) voxel data set is generated with the aid of a computed tomography scanner. In some aspects of the present disclosure a 3D image data set is generated by acquiring computed tomography images of the object. In other aspects of the present disclosure the 3D voxel data set of the object is generated with the aid of an image data reconstruction algorithm.

18 Claims, 11 Drawing Sheets

(56) References Cited

U.S. PATENT DOCUMENTS

2015/0125059 A1\* 5/2015 Holmes ................. A61B 6/032
 382/131
2015/0164455 A1 6/2015 Yamamura et al.
2015/0331115 A1\* 11/2015 Nelson ................. G01T 1/1611
 250/363.03

OTHER PUBLICATIONS

Zeng, K. [et al.]: An in vitro evaluation of cone-beam breast CT methods. Author manuscript, published on Apr. 2010, available at URL: http:llwww.ncbi.nlm.nih.govlpmclarticlesiPMC28551641, 34 pages.

\* cited by examiner

METHOD AND COMPUTER PROGRAM PRODUCT FOR GENERATING A HIGH RESOLUTION 3-D VOXEL DATA RECORD BY MEANS OF A COMPUTER

RELATED APPLICATIONS

The present application is a U.S. non-provisional filing of German Patent Application No. 10 2015 007 939.5, filed on Jun. 19, 2015, and the present application claims priority to and the benefit of the above-identified application, which is incorporated by reference herein in its entirety.

BACKGROUND

The invention relates to a method for generating a high-resolution 3D voxel data set of an object to be examined, with the aid of a computed tomography scanner, and to a computer program product in this regard.

Computed tomography (CT) is a method for obtaining information about the interior of objects. Computed tomography originates from the medical field, but in the meantime is also used in the industrial field for material analysis and for non-destructive examinations. The resolution of a CT recording depends on the distance between X-ray source and object. The smaller this distance, the higher the geometric magnification and thus also the resolution of the recording. The achievable resolution is limited in particular by the fact that the object has to be rotated by 180 degrees during the recording and, therefore, the distance between X-ray source and object cannot be arbitrarily small.

In other words, the resolution of computed tomography recordings, in particular of flat or planar structures (e.g. printed circuit boards), is limited by the fact that it is necessary to rotate the object by at least 180 degrees.

By means of two-dimensional (2D) recordings, i.e. recordings for which the object is not rotated, significantly higher resolutions can be achieved since the object can be brought significantly closer to the X-ray source. However, 2D recordings have the disadvantage that, in the case of objects consisting of a plurality of planes, these planes are all superimposed in the recording. Moreover, 2D X-ray recordings show only part of the object.

Therefore, a problem addressed by the present invention is that of providing a method by which the resolution of three-dimensional (3D) images in computed tomography can be increased.

This problem is solved by the subjects of the alternative independent claims. The dependent claims relate to advantageous embodiments.

A first independent aspect for solving the problem relates to a method for generating a high-resolution 3D voxel data set of an object to be examined, with the aid of a computed tomography scanner, comprising the following steps:

Generating a 3D image data set by acquiring a multiplicity of computed tomography images of the object;
Generating a 2D image data set by acquiring one or a plurality of additional images of the object, wherein the additional images for the 2D image data set have a higher resolution in comparison with the images acquired for the 3D image data set;
Generating the 3D voxel data set of the object to be examined, with the aid of an image data reconstruction algorithm that uses both the generated 3D image data set and the generated 2D image data set as input data set.

Within the meaning of this description a voxel data set or else volume data set is understood to be a data set comprising a multiplicity of voxels. In this case, a voxel is a grid point or image point in a three-dimensional grid or coordinate system. The multiplicity of voxels of the voxel data set thus constitute the three-dimensional volume of the object to be examined in the form of discrete points. The voxel data set comprises for each voxel a value that describes the attenuation of X-ray radiation at the location of the voxel, i.e. at a specific three-dimensional point of the object to be examined.

The term "high-resolution" is intended merely to mean that the resolution of the 3D voxel data set generated by the method according to the invention is higher than in conventional methods.

The term "acquiring" images encompasses, in particular, recording or measuring images.

A 3D image data set is generated by acquiring a multiplicity of computed tomography images, i.e. a series of images or an image sequence of the object. The images are acquired or measured with the aid of one or more detectors, in particular by means of a flat panel image detector, of the computed tomography scanner. In particular, the 3D image data set comprises a multiplicity of computed tomography images or a series of images or an image sequence. The individual images of the 3D image data set are acquired in each case from different perspectives or at different acquisition or recording angles. In particular, each image can be assigned to a specific perspective or to a specific recording angle. The recording angle is e.g. the angle between an axis, e.g. the longitudinal axis, of the object to be examined and an optical axis of the computed tomography scanner. The optical axis can be defined e.g. by the connecting line between X-ray source and detector of the computed tomography scanner. Preferably, the 3D image data set comprises images for recording angles of 0° to 180°, even more preferably of 0° to 360°.

The images acquired for the 3D image data set are so-called standard CT images, i.e. images having a standard resolution. Within the meaning of this description, standard images are understood to be in particular such images which are recorded if the object is arranged in a so-called standard position. In the standard position, the object is arranged between the X-ray source and the at least one detector in such a way that it is rotatable, in particular rotatable by 180° or preferably by 360°. In the standard position, the object to be examined thus cannot be situated arbitrarily near to the X-ray source, for which reason the resolution of such standard images is limited to a standard resolution. In other words, the standard resolution is that resolution with which CT images are conventionally acquired for a 3D measurement.

In addition to the computed tomography images acquired for the 3D image data set, according to the invention one or a plurality of additional images are also acquired as well, which serve for generating a 2D image data set. Said additional images have a higher resolution in comparison with the standard images, i.e. in comparison with the images acquired for the 3D image data set. The higher resolution can be achieved e.g. by virtue of the fact that the object to be examined is arranged nearer to the X-ray source in comparison with the standard position. In this way, the geometric magnification and, consequently, also the resolution of the acquired images or image data can be increased. When acquiring the additional images for the 2D image data set, the object need not be rotated, for which reason it can be arranged arbitrarily near to the X-ray source.

The at least one additional image can be acquired from one or a plurality of selected regions of the object. Preferably, a multiplicity of additional images are acquired, i.e. a series of additional images or an additional image sequence. The different additional images acquired can in this case image respectively different regions of the object.

Preferably, the 3D image data set and/or the 2D image data set furthermore comprise(s) for each acquired image metadata describing the position and/or the perspective or the recording angle of the object.

Both the 3D image data set, i.e. the image data set generated from the standard images, and the 2D image data set, i.e. the image data set generated from the high- or higher-resolution images, form the input data set for an, in particular iterative, image data reconstruction algorithm used to generate or calculate the high-resolution 3D voxel data set of the object to be examined.

For the image data reconstruction algorithm the resolution of the result volume or of the voxel data set is preferably chosen such that a detector pixel divided by a magnification factor of the 2D image data set generation corresponds to a voxel of the result volume, wherein the magnification factor corresponds to the focus-detector distance divided by the focus-object distance during the 2D image data set generation.

The method according to the invention thus advantageously combines the data from a normal or standard 3D computed tomography data set with a high-resolution 2D data set in order to create a high-resolution 3D data set therefrom. In other words, the low-resolution 3D data and the high-resolution 2D data are advantageously combined in order to obtain a 3D data set in which the individual planes are separated, but in which the high resolution of the 2D recordings parallel to the planes is maintained.

In the method according to the invention, therefore, the X-ray recordings effected for the normal CT and the high-resolution 2D X-ray recordings are reconstructed simultaneously to form a high-resolution voxel data set with the aid of the image data reconstruction algorithm.

In one preferred embodiment of the method according to the invention, the object for generating the 3D image data set is arranged in a first position, preferably rotatably, between an X-ray source and a detector of the computed tomography scanner. For generating the 2D image data set the object is arranged in a second position, whose distance from the X-ray source is smaller in comparison with the first position.

The first position corresponds to the standard position already mentioned further above. In said standard position, a normal CT recording, i.e. a CT recording with a conventional resolution, can thus be effected. The focus-object distance or the distance between the object and the X-ray source in this first position is large enough that the object can rotate and the entire object can be imaged onto the detector during the rotation.

The second position can correspondingly also be designated as high-resolution position. High-resolution 2D X-ray recordings with a smaller focus-object distance are effected in this second position. Preferably, the object is arranged with a longitudinal axis orthogonal to the optical axis or to the connecting line between focus or X-ray source and midpoint of the detector. Since the object need not be rotated for generating the 2D image data set, the focus-object distance can be chosen to be significantly smaller and thus the magnification can be chosen to be significantly greater.

The respective distances or positions of the object are dependent, in principle on the shape and size of the object. By way of example, the distance between the object and the X-ray source in the first position or standard position may be approximately 5 cm while the distance between the object and the X-ray source in the second position or high-resolution position may be only approximately 1 cm. It goes without saying that these values represent only exemplary values.

In a further preferred embodiment of the method according to the invention, generating the 3D image data set of the object comprises rotating the object, in particular by 360°. Alternatively or additionally, generating the 2D image data set of the object comprises displacing the object in a plane arranged perpendicular to the longitudinal axis or optical axis of the computed tomography scanner.

On account of the high magnification achieved when generating the 2D image data set, i.e. if the object is situated in the second position or in the high-resolution position, it may be that only parts of the object are visible on the detector. In order nevertheless to image larger regions, a plurality of recordings can be effected, wherein the object is displaced orthogonally with respect to the connecting line between focus or X-ray source and detector midpoint between the recordings. If the direction of the connecting line between X-ray source and detector midpoint is designated as the Z-axis, then the object is thus displaced in the X- and/or Y-direction, i.e. in the X-Y plane. In this case, the step size is preferably chosen to be small in order to minimize the effect of individual planes of the object on neighbouring planes during the reconstruction. By way of example, the step size may be one tenth of the detector size divided by the magnification factor.

In a further preferred embodiment of the method according to the invention, the image data reconstruction algorithm is based on a Maximum Likelihood Expectation Maximization (MLEM) algorithm. In particular, the image data reconstruction algorithm is a Maximum Likelihood Expectation Maximization (MLEM) algorithm.

In a further preferred embodiment of the method according to the invention, the image data reconstruction algorithm comprises calculating a normalization volume data set, wherein the normalization volume data set results as the sum of a normalization volume data set associated with the 3D image data set and a normalization volume data set associated with the 2D image data set and weighted with a weighting factor.

Expressed in formulae, the normalization volume data set norm is calculated as follows:

$$\text{norm} = P_1^T(\text{normseq}_1) + w \cdot P_2^T(\text{normseq}_2) \tag{1}$$

wherein $P^T(I)$ generally represents a transposed projection or a back projection of an image sequence I. The index 1 in equation (1) means that the back projection relates to a first image data set, namely the 3D image data set having standard resolution, while the index 2 correspondingly means that the back projection relates to a second image data set, namely the 2D image data set having higher resolution. $\text{normseq}_1$ denotes a normalized image sequence of the 3D image data set and normseq2 denotes a normalized image sequence of the 2D image data set. In equation (1), w is the weighting factor. The weighting factor w can have an arbitrary positive value, e.g. the value 5, depending on the application. In particular, it may be the case that w=1.

In particular, in equation (1)

$$\text{normseq}_1 := 1 \text{ and normseq}_2 := 1 \tag{2}$$

are defined.

In a further preferred embodiment of the method according to the invention, the image data reconstruction algorithm comprises calculating a projection associated with the 3D image data set and a projection associated with the 2D image data set.

Expressed in formulae, a projection associated with the 3D image data set $$\text{proj}_1 := P_1(\text{vol}_n) \quad (3)$$

and a projection associated with the 2D image data set $$\text{proj}_2 := P_2(\text{vol}_n) \quad (4)$$

are calculated. In this case, $\text{vol}_n$ denotes the volume data set in the n-th iteration step.

In a further preferred embodiment of the method according to the invention, each pixel of the generated 3D image data set is divided by the corresponding pixel of the projection associated with the 3D image data set, as a result of which a modulated projection $$\text{proj}_1^* := \frac{\text{input}_1}{\text{proj}_1}$$

associated with the 3D image data set is obtained. Furthermore, each pixel of the generated 2D image data set is divided by the corresponding pixel of the projection associated with the 2D image data set, as a result of which a modulated projection $$\text{proj}_2^* := \frac{\text{input}_2}{\text{proj}_2}$$

associated with the 2D image data set is obtained.

In a further preferred embodiment of the method according to the invention, a, preferably unfiltered, back projection is calculated on the basis of the modulated projection $\text{proj}_1^*$ associated with the 3D image data set and the modulated projection $\text{proj}_2^*$ associated with the 2D image data set.

In a further preferred embodiment of the method according to the invention, the back projection is calculated as the sum of a, preferably unfiltered, back projection associated with the 3D image data set and a, preferably unfiltered, back projection associated with the 2D image data set and weighted with a weighting factor.

Expressed in formulae, this back projection is calculated as follows:

$$\text{backproj} := P_1^T(\text{proj}_1^*) + w \cdot P_2^T(\text{proj}_2^*) \quad (5),$$

wherein w is the weighting factor. In particular, the weighting factors in equation (1) and equation (5) are identical.

A further independent aspect for solving the problem relates to a computer program product comprising machine-readable program code which, when loaded on a computer, is suitable for performing the method according to the invention.

For the abovementioned further independent aspect and in particular for preferred embodiments in this regard, the explanations given above or below concerning the embodiments of the first aspect also hold true. In particular, for one independent aspect of the present invention and for preferred embodiments in this regard, the explanations given above and below concerning the embodiments of the respective other aspects also hold true.

Individual embodiments for solving the problem are described by way of example below with reference to the figures. In this case, the individual embodiments described have in part features which are not absolutely necessary for implementing the claimed subject matter, but which provide desired properties in specific applications. In this regard embodiments which do not have all the features of the embodiments described below are also intended to be regarded as disclosed in a manner coming under the technical teaching described. Furthermore, in order to avoid unnecessary repetitions, specific features are mentioned only with regard to individual embodiments from among the embodiments described below. It is pointed out that the individual embodiments are therefore intended to be considered not only by themselves but also in a joint consideration. On the basis of this joint consideration the person skilled in the art will recognize that individual embodiments can also be modified by inclusion of individual or a plurality of features of other embodiments. It is pointed out that a systematic combination of the individual embodiments with individual or a plurality of features described with regard to other embodiments may be desirable and expedient and is therefore intended to be taken into account and also to be regarded as encompassed by the description.

BRIEF DESCRIPTION OF THE DRAWINGS

These and other objects, features, aspects, and advantage of the present disclosure will become better understood with regard to the following description, claims, and drawings. The present disclosure is illustrated by way of example, and not limited by, the accompanying figures in which like numerals indicate similar elements. Moreover, a list of reference numerals and corresponding explanations are provided in Table I.

DETAILED DESCRIPTION

The following abbreviations, symbols and signs are used in the present description:

u and v denote the position of a pixel in a 2D image;
a is an index specifying an image in an image sequence;
x, y and z describe the position of a voxel in a volume or voxel data set;
n denotes the current iteration step;
input denotes an image sequence which is recorded by a computed tomography scanner and which is used as input data set for the MLEM;
input(u, v, a) describes an attenuation of X-ray radiation for the pixels (u, v) of the image a;
$vol_0$ denotes the starting or initial result volume;
$vol_n$ denotes the result volume after the n-th iteration step;
normseq, proj and proj* denote temporary image sequences;
backproj and backprojnorm denote temporary volume or voxel data sets;
norm is a normalization volume;
P(V) denotes an image sequence generated by a forward projection of the volume V;
$P^T$(I) denotes a volume generated by an unfiltered back projection of the image sequence I.

Figure 1:
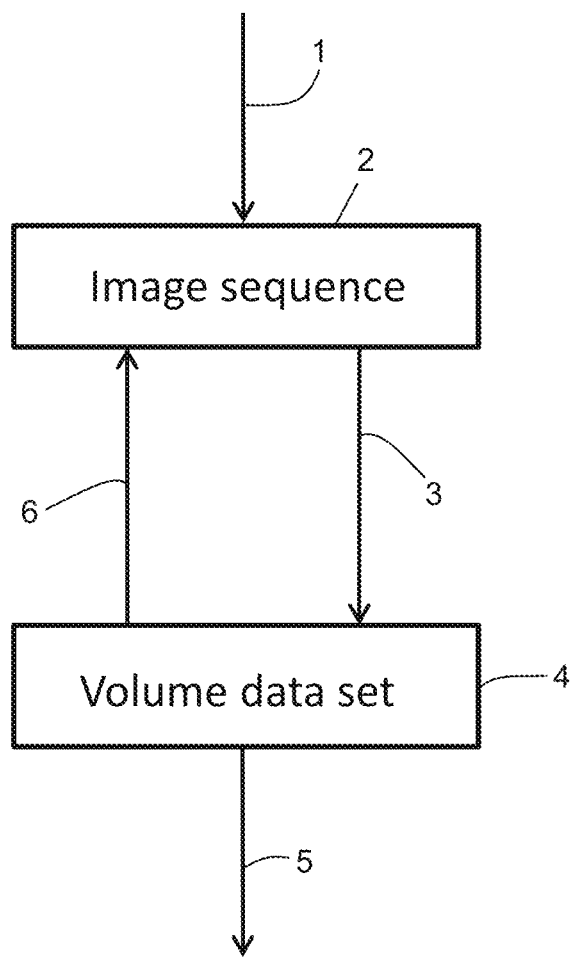
FIG. 1 shows a schematic flow diagram concerning the reconstruction of CT images in accordance with the prior art.

FIG. 1 schematically shows the data flow such as is conventionally implemented during a reconstruction of CT images. A CT reconstruction is understood to be the step identified by the reference sign 3 in FIG. 1, in which a 3D voxel or volume data set 4 is generated on the basis of the raw images recorded by a computed tomography scanner. The 3D volume data set finally describes the interior of the object to be examined.

As illustrated in FIG. 1, firstly in a first step 1 a multiplicity of CT images are recorded by the computed tomography scanner from different perspectives or at different recording angles. This gives rise to a series of images or an image sequence 2 that forms the starting point for the reconstruction 3. The reconstruction step 4 can be carried out essentially by means of three different methods. The most frequently used reconstruction methods are so-called unfiltered and filtered back projection. Alternatively, iterative methods are also used, which, although more time-consuming, in return also yield a volume data set with reduced artefacts and lower noise. One of said iterative methods is the Maximum Likelihood Expectation Maximization (MLEM) algorithm. After the reconstruction step 4, the volume data can be processed further, conditioned or evaluated in a further step 5.

Step 6 illustrated in FIG. 1, the so-called projection, simulates the inverse process of step 3. During the projection, therefore, an image sequence 2 is calculated on the basis of a volume data set 4. This step is required particularly for the MLEM. The unfiltered back projection is the transposed operation of projection and is used as part of the filtered back projection and as part of the MLEM.

The input data for the reconstruction process comprise an image sequence acquired by the detector of the computed tomography scanner or a series of images, wherein the series typically comprises approximately 1800 images. In addition, the input data also comprise metadata describing the position and the recording angle of the object for each image of the series. The output or result data of the reconstruction process comprise a voxel or volume data set describing the attenuation of the X-ray radiation for each voxel of the object.

The basic methods of projection, unfiltered back projection, filtered back projection and of the MLEM algorithm are described in greater detail below.

Projection:

Projection is a process in which an image sequence is calculated on the basis of a volume data set. The projection proj=P(vol) is calculated by the following steps i) and ii), wherein the calculation is carried out for all images a of the image sequence and for all pixels (u, v) per image, wherein $a \in \{1, \ldots, numImages\}$ with the number numImages of images in the series and wherein $(u, v) \in \{1, \ldots, numPixelU\} \times \{1, \ldots, numPixelV\}$ with the number numPixelu of pixels u and the number numPixelv of pixels v:

i) Calculating the 3D coordinate point $(det_x, det_y, det_z)$ which corresponds to the detector pixel (u, v) using the geometry or the metadata of the image a;

ii) Calculating the line integral from the position of the X-ray source $(src_x, src_y, src_z)$ to the position of the detector $(det_x, det_y, det_z)$ by means of trilinear interpolation and storage of the result for the current pixel:

$$vec := (det_x, det_y, det_z) - (src_x, src_y, src_z), \quad (6)$$

$$dist := |vec|, \quad (7)$$

$$dir := \frac{vec}{dist}, \quad (8)$$

$$proj(u, v, a) := \int_0^{dist} vol(src + s \cdot dir) ds. \quad (9)$$

Unfiltered Back Projection:

The unfiltered back projection calculates the volume data set on the basis of an image sequence. This operation is thus the transposed operation of projection. The unfiltered back projection is calculated with the aid of the following steps:

i) Setting all voxels of the result data set vol to 0:

$$vol(x,y,z) := 0 \quad (10);$$

ii) For all images $a \in \{1, \ldots, numImages\}$ and all voxels $(x,y,z) \in \{1, \ldots, numVoxelX\} \times \{1, \ldots, numVoxelY\} \times \{1, \ldots, numVoxelZ\}$ of the result volume:

a) Calculating the point (u, v) on the detector on which a line running through the X-ray source src and the point (x, y, z) impinges (i.e. calculating the point of intersection of the line with the detector plane); the geometry or the metadata of the image a are used for the calculation;

b) Adding the value at (u, v) to the current value of the output or result voxel using a bilinear interpolation, wherein the value 0 is used provided that (u, v) lies outside the input image:

$$vol(x,y,z) := vol(x,y,z) + proj(u,v,a) \quad (11).$$

Filtered Back Projection:

The unfiltered back projection described above has the disadvantage that the resulting image is blurred and/or that fine details are indiscernible. Therefore, in computed tomography a filtered back projection is usually used in which firstly a digital filter, in particular a high-pass filter, is applied to the input data before the unfiltered back projection, as described above, is performed.

Maximum Likelihood Expectation Maximization (MLEM):

An alternative to filtered back projection is iterative methods in which an initial estimation for the volume data set is iteratively improved. Such iterative solutions have the advantage of lower noise and are therefore used primarily in techniques such as positron emission tomography in which the signal-to-noise ratio is very low. One iterative method is MLEM. In MLEM the problem of CT reconstruction is defined and iteratively solved by means of a linear equation system:

$$A \cdot \text{vol} = \text{input} \tag{12}$$

wherein A represents a matrix describing the projection operation, i.e. $A \cdot \text{vol} = P(\text{vol})$.

The individual steps during the MLEM reconstruction are as follows:

i) Calculating a normalization volume data set norm as unfiltered back projection of an image sequence, wherein all pixels have a value of 1:

$$\text{normseq}(u,v,a) := 1 \tag{13}$$

$$\text{norm} := P^T(\text{normseq}) \tag{14};$$

ii) Selecting a starting or initial volume vol$e$, wherein normally all voxels are set to the value 1 and setting the current iteration index to 0:

$$\text{vol}_0(x,y,z) := 1 \tag{15},$$

$$n := 0 \tag{16};$$

iii) Calculating a projection of the current volume:

$$\text{proj} := P(\text{vol}_n) \tag{17};$$

The way in which the projection is calculated has already been explained further above in the section "Projection".

iv) Dividing each pixel in the input image sequence input by the corresponding pixel in the image sequence proj from step iii):

$$\text{proj}^*(u, v, a) := \frac{\text{input}(u, v, a)}{\text{proj}(u, v, a)}; \tag{18}$$

v) Calculating the unfiltered back projection from proj*:

$$\text{backproj} := P^T(\text{proj}^*) \tag{19};$$

The way in which the unfiltered back projection is calculated has already been explained further above in the section "Unfiltered Back Projection".

vi) Dividing each voxel in backproj by the corresponding voxel in the normalization volume $$\text{backprojnorm}(x, y, z) := \frac{\text{backproj}(x, y, z)}{\text{norm}(x, y, z)}; \tag{20}$$

vii) Setting each voxel of the result volume of the current iteration step as output or result voxel of the preceding iteration step multiplied by the corresponding voxel in backprojnorm:

$$\text{vol}_{n+1}(x,y,z) = \text{vol}_n(x,y,z) \cdot \text{backprojnorm}(x,y,z) \tag{21};$$

viii) Increasing the iteration index of the current iteration:

$$n := n+1 \tag{22};$$

ix) If n is less than the maximum number of iteration steps, go to step iii).

It has been recognized in the context of the present invention that the reconstruction of the CT images can be further improved by additional images also being integrated into the MLEM process besides the standard CT images. In particular, the inventors have recognized that the addition of further images can increase the quality of the solution of the MLEM iteration process by additional equations, which provide additional information about the volume, being added to the MLEM equation system.

Consequently, according to the invention, the computed tomography scanner records not only the standard CT images, i.e. the images conventionally used for generating a 3D voxel data set, but also high-resolution 2D additional images as well. All recorded images, i.e. both the standard CT images and the additional images, can then be used and processed as input data in a correspondingly modified MLEM algorithm. In other words, during the reconstruction the 2D image data set generated by means of the high-resolution additional images can be integrated into the low-resolution 3D image data set generated by means of the standard CT images.

Figure 2:
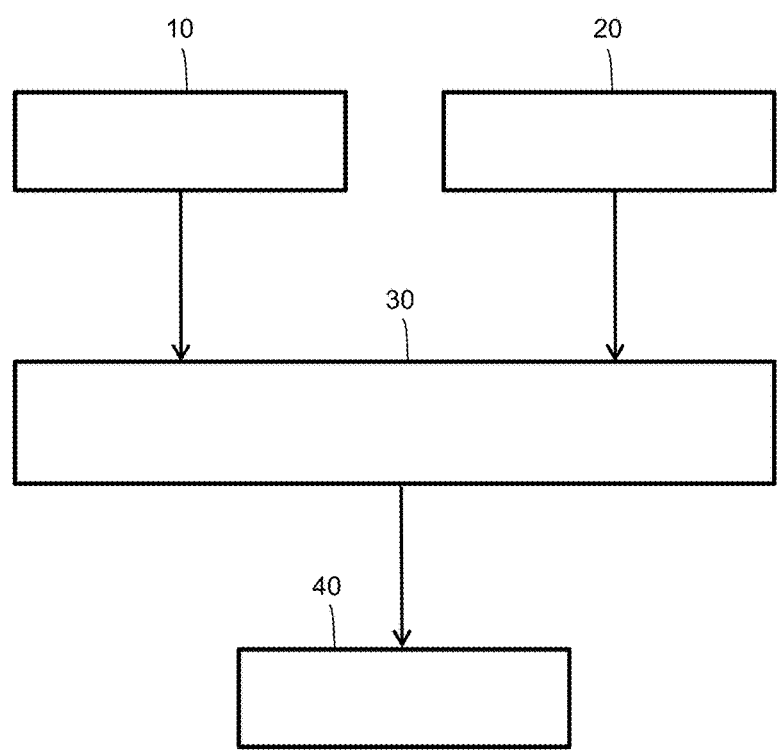
FIG. 2 shows a schematic flow diagram of the method according to the invention in accordance with one preferred embodiment.

FIG. 2 shows a schematic flow diagram of the method according to the invention in accordance with one preferred embodiment. For this purpose, a 3D image data set 10 is generated by a multiplicity of standard computed tomography images of the object to be examined being acquired by means of a detector. In addition, a 2D image data set 20 is generated by one or a plurality of additional images of the object being acquired. Said additional images have a higher resolution in comparison with the images acquired for the 3D image data set 10, i.e. in comparison with the standard images. Finally, a high-resolution 3D voxel data set 40 of the object to be examined is calculated on the basis of the generated 3D image data set 10 and the generated 2D image data set 20 with the aid of an image data reconstruction algorithm 30. The resolution of the result volume of the reconstruction is preferably chosen such that a detector pixel divided by the magnification factor of the 2D image data set generation corresponds to a voxel of the result volume, wherein the magnification factor corresponds to the focus-detector distance divided by the focus-object distance during the 2D image data set generation.

Figure 3:
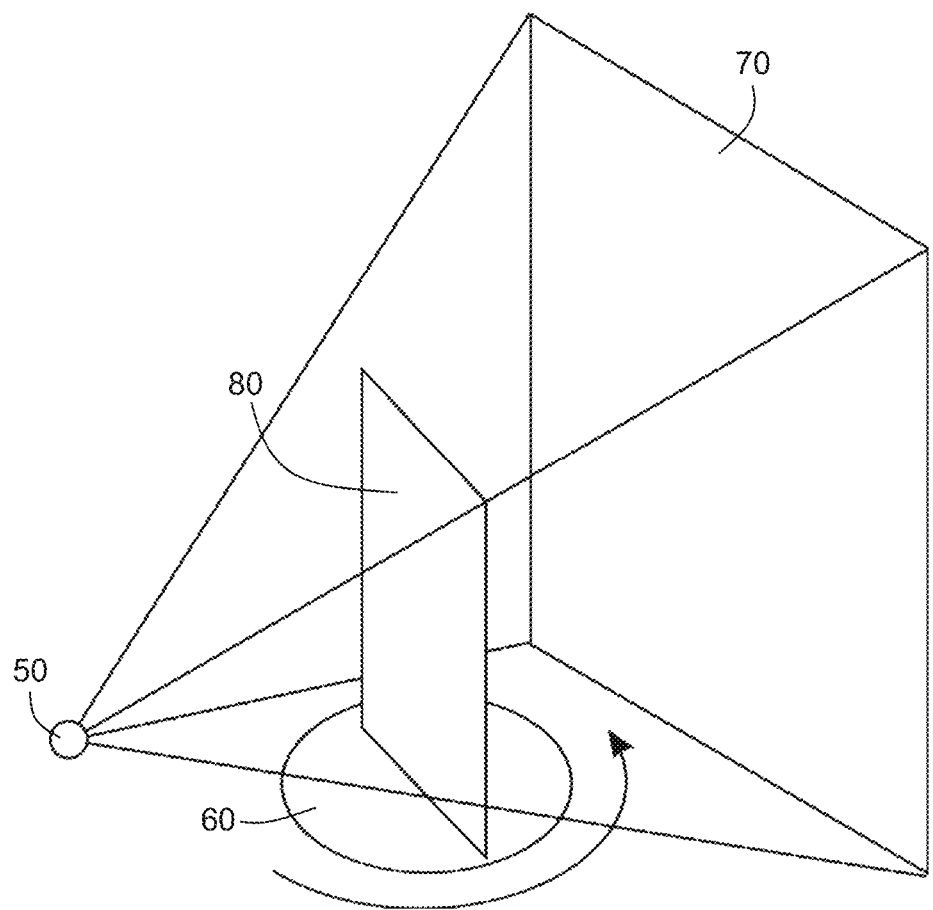
FIG. 3 shows a schematic diagram concerning the acquisition of standard CT images.

FIG. 3 shows a schematic diagram for the acquisition of the standard CT images or for the generation of the 3D image data set 10 from FIG. 2. For this purpose, an excerpt from a computed tomography scanner with an X-ray source 50 and a detector 70 is illustrated schematically. The object 80 to be examined is situated on a rotatably mounted object carrier 60 arranged in a position between the X-ray source 50 and the detector 70 in such a way that the object carrier 60 with the object 80 is rotatable by 360°. Since this position of the object carrier is conventionally used for the recording of images for generating a 3D voxel data set, the position is also referred to as the standard position. In this standard position, the object 80 has to be arranged at a minimum distance from the X-ray source 50 in order that the object 80 can be rotated, wherein the entire object 80 is imaged on the detector 70 during the entire rotation. This minimum distance, which depends in particular on the shape and size of the object 80 to be examined, restricts the geometric magnification and thus also the resolution of the recorded CT images. The achieved resolution with the device shown in FIG. 3 is therefore also referred to as the standard resolution.

Figure 4:
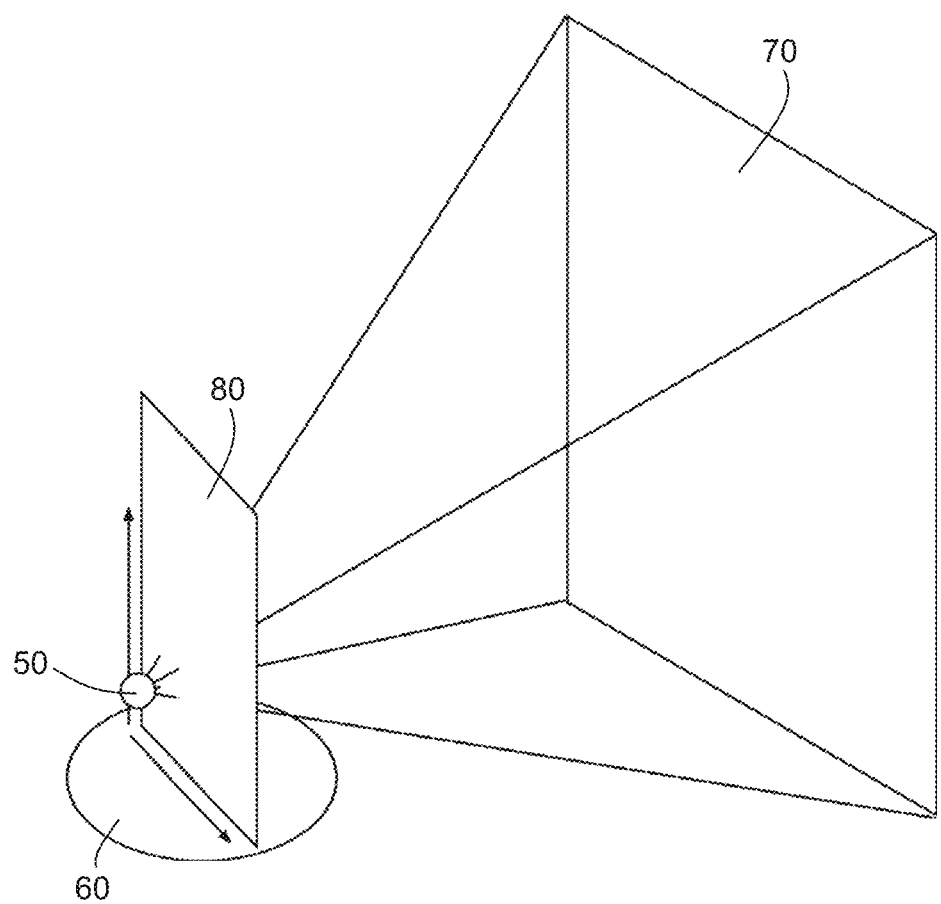
FIG. 4 shows a schematic diagram concerning the acquisition of high-resolution CT images.

FIG. 4 shows a schematic diagram for the acquisition of the high-resolution CT additional images. In contrast to FIG.

3, now the object carrier 60 or the object 80 to be examined is displaced in the direction of the X-ray source 50. In other words, the object 80 is now still arranged between the X-ray source 50 and the detector 70, but as near as possible to the X-ray source 50. By way of example, the distance between the object 80 and the X-ray source 50 is only 1 cm. In this so-called high-resolution position of the object 80, the geometric magnification and thus also the resolution of the recorded CT images are higher than the resolution of the standard CT images recorded in the standard position. Since the object 80 is no longer rotatable by 360° in the high-resolution position, this position cannot be used for generating the 3D image data set. Rather, exclusively the additional images according to the invention are acquired in the high-resolution position. On account of the high geometric magnification, generally the entire object is not acquired by an additional image. Therefore, a plurality of additional images are preferably recorded, wherein between the individual recordings the object is displaced along the x- and/or y-direction, i.e. in the x-y plane, orthogonally with respect to the X-ray source-detector axis.

It has been found in the context of the present invention that the MLEM algorithm is suitable for the image data reconstruction algorithm 30, which can process both the standard images and the additional images to form a high- or higher-resolution 3D voxel data set in comparison with conventional methods, in which algorithm, however, the individual steps described above must be at least partly modified or extended on account of the additional images additionally acquired. In particular, the MLEM algorithm must be modified in such a way that both the 3D image data set and the 2D image data set can be used as input data.

The individual steps of a modified MLEM with resolution improvement are as follows:

i) Calculating a normalization volume data set norm as unfiltered back projection of an image sequence, wherein all pixels have a value of 1:

$$\text{normseq}_1(u,v,a) := 1 \qquad (23),$$

$$\text{normseq2}(u,v,a) := 1 \qquad (24),$$

$$\text{norm} := P_1^T(\text{normseq}_1) + w \cdot P_2^T(\text{normseq}_2) \qquad (25).$$

As already mentioned in conjunction with equation (1), the index 1 in equations (23) and (25) relates to the 3D image data set, i.e. the image data set having standard resolution. The index 2 correspondingly relates to the 2D image data set, i.e. the image data set having higher resolution. normseq$_1$ thus denotes a normalized image sequence of the 3D image data set and normseq$_2$ denotes a normalized image sequence of the 2D image data set. In equation (25), which is identical to equation (1), w denotes a weighting factor with which the additional images can be weighted in comparison with the standard images, i.e. in terms of their relevance within the algorithm.

ii) Selecting a starting or initial volume vol$_0$, wherein all voxels are normally set to the value 1, and setting the current iteration index to 0:

$$\text{vol}_0(x,y,z) := 1 \qquad (26),$$

$$n := 0 \qquad (27);$$

iii) Calculating projections of the current volume; also see formulae (3) and (4):

$$\text{proj}_1 := P_1(\text{vol}_n) \qquad (28),$$

$$\text{proj}_2 := P_2(\text{vol}_n) \qquad (29);$$

The way in which the projections are calculated has already been explained further above in the section "Projection".

iv) Dividing each pixel in the input image sequence input by the corresponding pixel in the image sequence proj from step iii):

$$\text{proj}_1^*(u, v, a) := \frac{\text{input}_1(u, v, a)}{\text{proj}_1(u, v, a)}, \qquad (30)$$

$$\text{proj}_2^*(u, v, a) := \frac{\text{input}_2(u, v, a)}{\text{proj}_2(u, v, a)}; \qquad (31)$$

v) Calculating the unfiltered back projection from proj*:

$$\text{backproj} := P_1^T(\text{proj}_1^*) + P_2^T(\text{proj}_2^*) \qquad (32);$$

The way in which the unfiltered back projection is calculated has already been explained further above in the section "Unfiltered Back Projection".

vi) Dividing each voxel in backproj by the corresponding voxel in the normalization volume:

$$\text{backprojnorm}(x, y, z) := \frac{\text{backproj}(x, y, z)}{\text{norm}(x, y, z)}; \qquad (33)$$

vii) Setting each voxel of the result volume of the current iteration step as output or result voxel of the preceding iteration step multiplied by the corresponding voxel in backprojnorm:

$$\text{vol}_{n+1}(x,y,z) = \text{vol}_n(x,y,z) \cdot \text{backprojnorm}(x,y,z) \qquad (34);$$

viii) Increasing the iteration index of the current iteration:

$$n := n+1 \qquad (35);$$

ix) If n is less than the maximum number of iteration steps, go to step iii).

Figure 5:
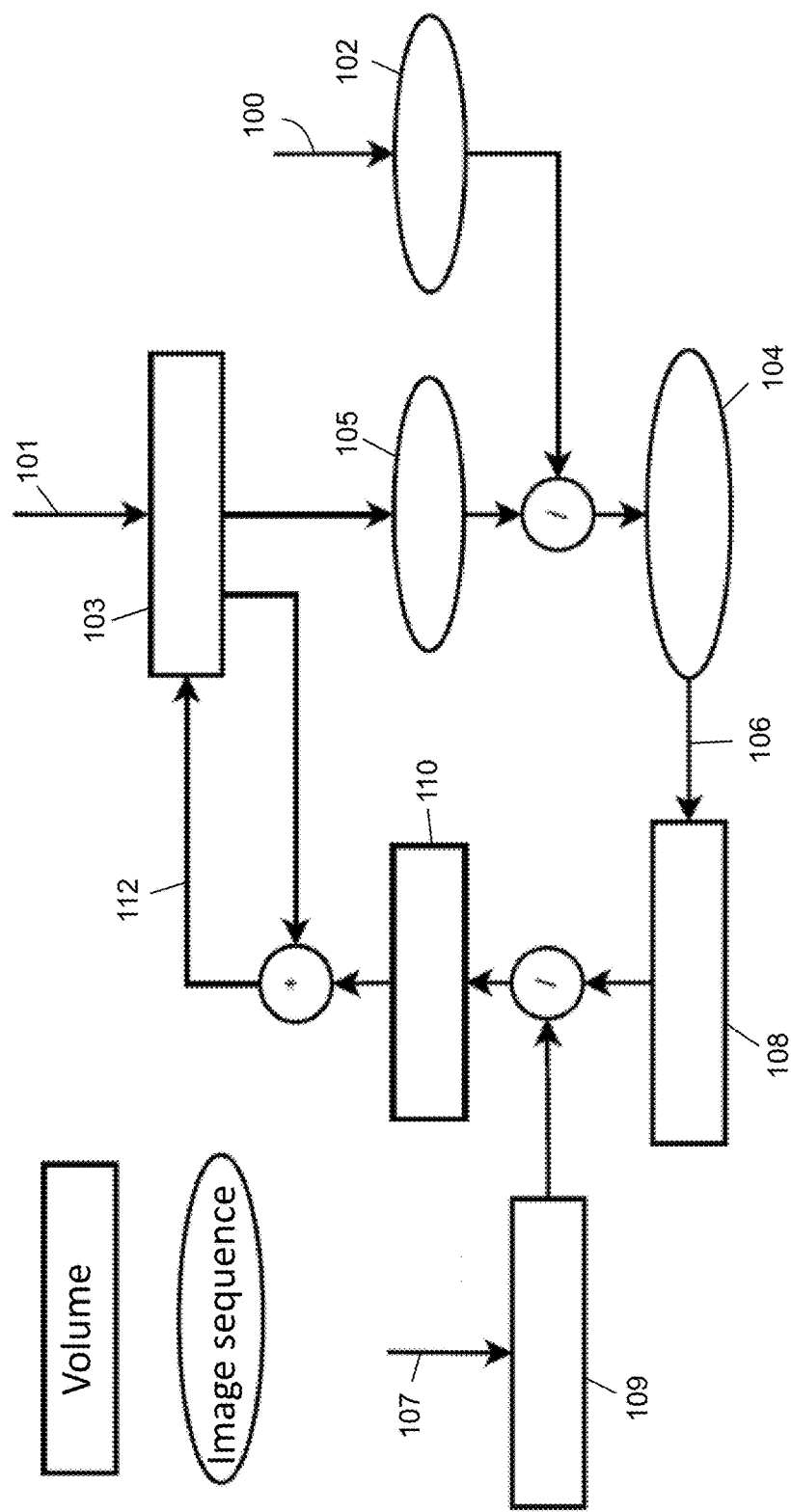
FIG. 5 shows a schematic flow diagram of an MLEM image data reconstruction algorithm for the method according to the invention in accordance with one preferred embodiment.

FIG. 5 shows the MLEM image data reconstruction algorithm in accordance with one preferred embodiment on the basis of a schematic flow diagram. Here in each case a volume or a volume data set is symbolized with a rectangle and an image sequence is symbolized with an ellipse. In step 100, the 3D image data set and the 2D image data set are provided as input data 102. In step 101, firstly a first estimated value (e.g. 1) is assumed in order to calculate an initial volume data set 103. This volume data set is finally adapted or improved iteratively. Projections 105 are calculated on the basis of the volume data set 103. The 3D and 2D input image data set 102 is in each case divided by the result of these calculated projections 105, as a result of which an image sequence ratio 104 is obtained. Back projections 108 are calculated by step 106. The result of said back projections 108 is in each case divided by a 3D and 2D normalization volume data set 109 resulting from an unfiltered back projection 107, wherein a normalized volume data set 110 is obtained. In step 112, finally, the starting data for the next iteration step are calculated by the normalized volume data set 110 being multiplied by the volume data set 103 of the preceding iteration step. The result of this multiplication is the starting point for the next iteration step.

FIGS. 6 to 11 show exemplary results of the resolution improvement of the method according to the invention in comparison with conventional methods.

Figure 6:
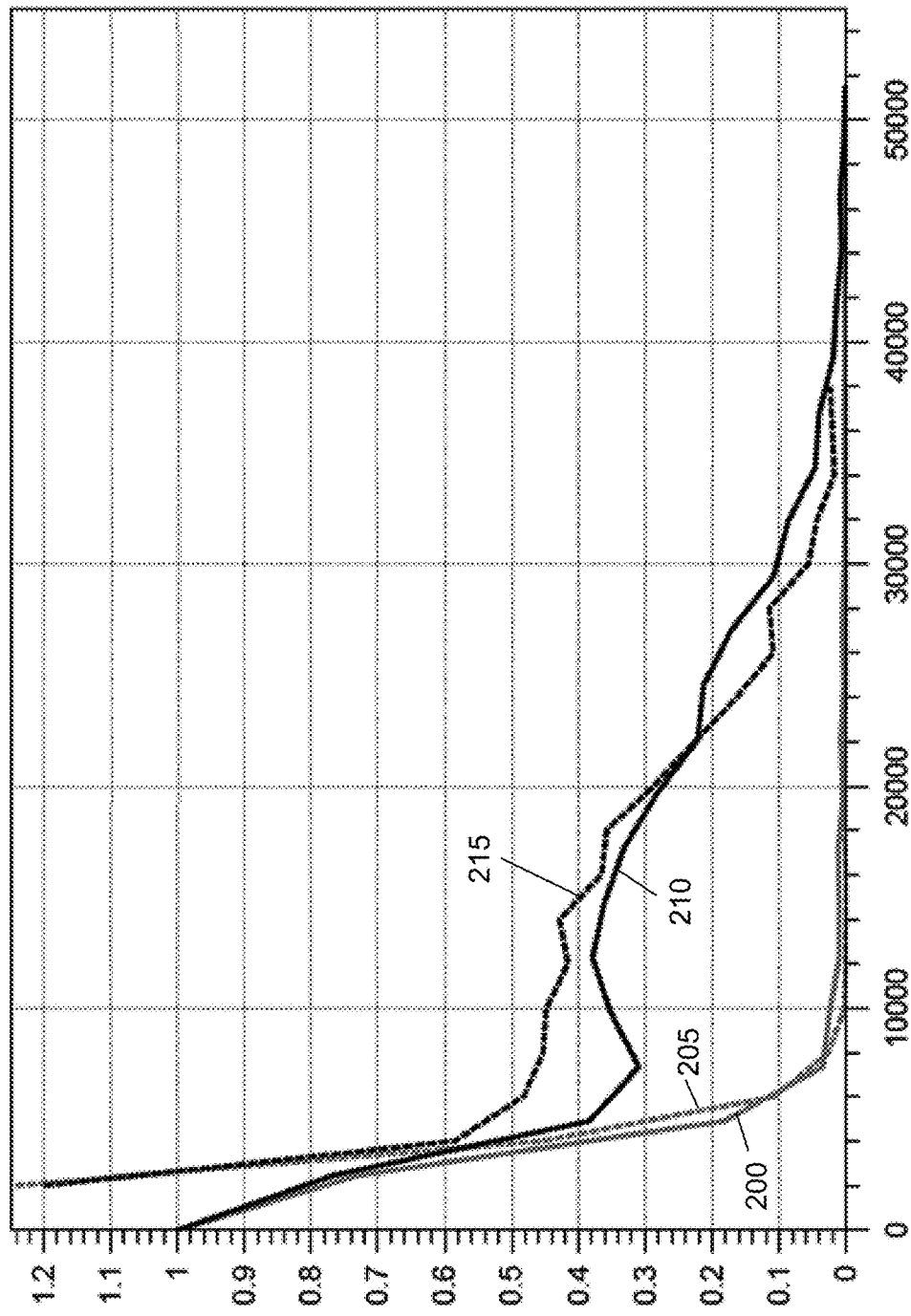
FIG. 6 shows an exemplary simulation of the modulation transfer function and the line pair contrast as a function of the spatial frequency for a conventional CT measurement and a CT measurement by means of the method according to the invention.

FIG. 6 shows a simulation modulation transfer function 200 and a simulated line pair contrast 205 as a function of the spatial frequency for a conventional CT measurement. For comparison purposes, a corresponding simulated modulated transfer function 210 and a simulated line pair contrast 215 for a CT measurement by means of the method according to the invention are also shown in the diagram. Both the modulation transfer function and the line pair contrast are a measure of the quality of the volume data set generated. As is evident from FIG. 6, the method according to the invention (curves 210 and 215) is distinctly superior to the conventional method (curves 200 and 205) with regard to resolution.

Figure 7:
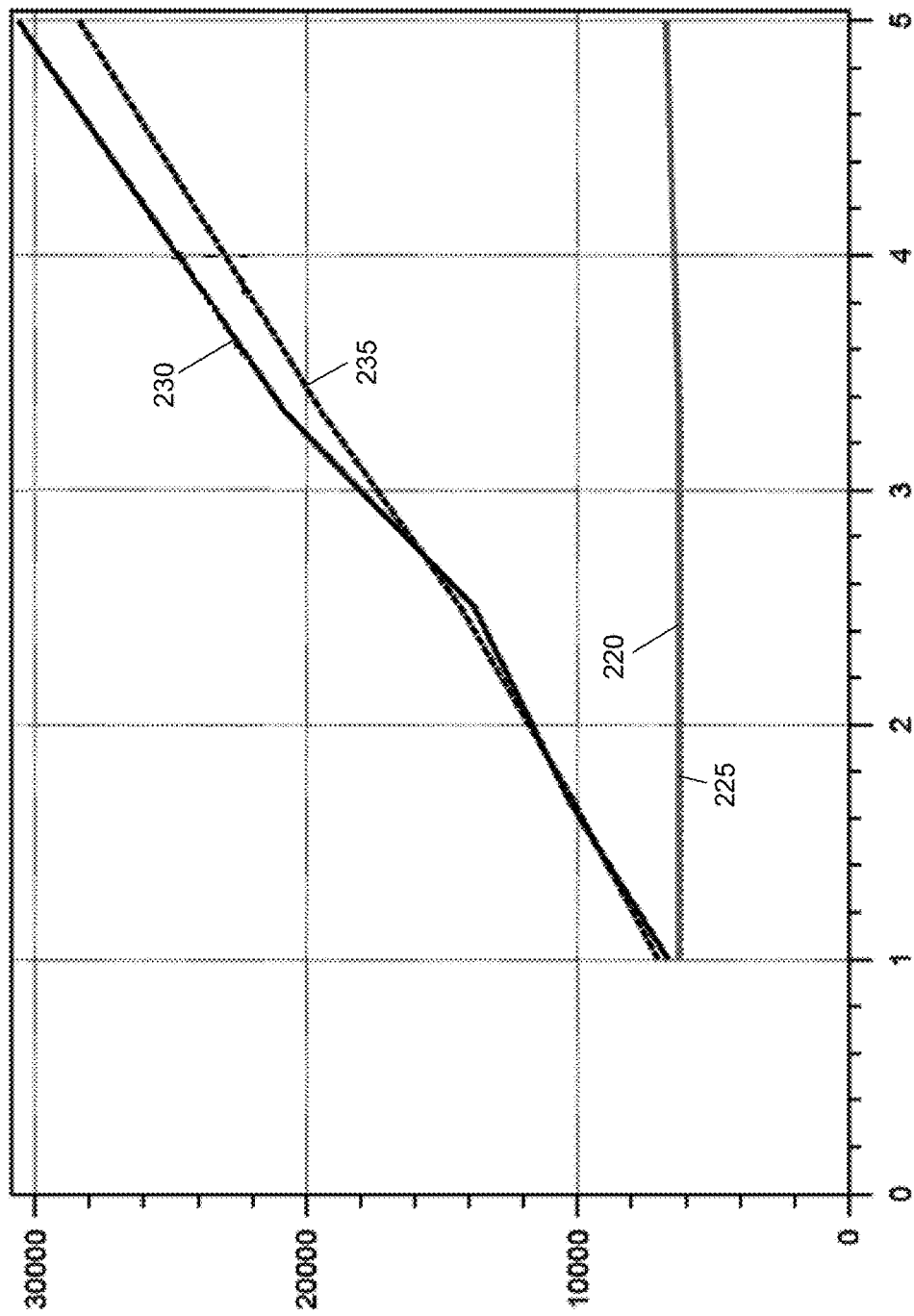
FIG. 7 shows an exemplary simulation of the absolute spatial resolution for a conventional CT measurement and a CT measurement by means of the method according to the invention, wherein the absolute spatial resolution is plotted as a function of the ratio between standard resolution and high resolution.

FIG. 7 shows a simulation of the absolute spatial resolution for a conventional CT measurement and a CT measurement by means of the method according to the invention. The absolute spatial resolution is plotted here in each case as a function of the ratio between standard resolution and high resolution, i.e. as a function of the resolution ratio between the standard images and the additional images. In FIG. 7, the curve 220 represents a simulated modulation transfer function and the curve 225 represents a line pair contrast for a conventional CT measurement, while the curve 230 represents a corresponding simulated modulation transfer function and the curve 235 represents a line pair contrast for a CT measurement which was carried out by means of the method according to the invention. In the case of the curves shown, the highest resolution at which the modulation transfer function or the line pair contrast is still at least 10% is always indicated. FIG. 7 also reveals that the method according to the invention (curves 230 and 235) is distinctly superior to the conventional method (curves 220 and 225) with regard to resolution.

Figure 8:
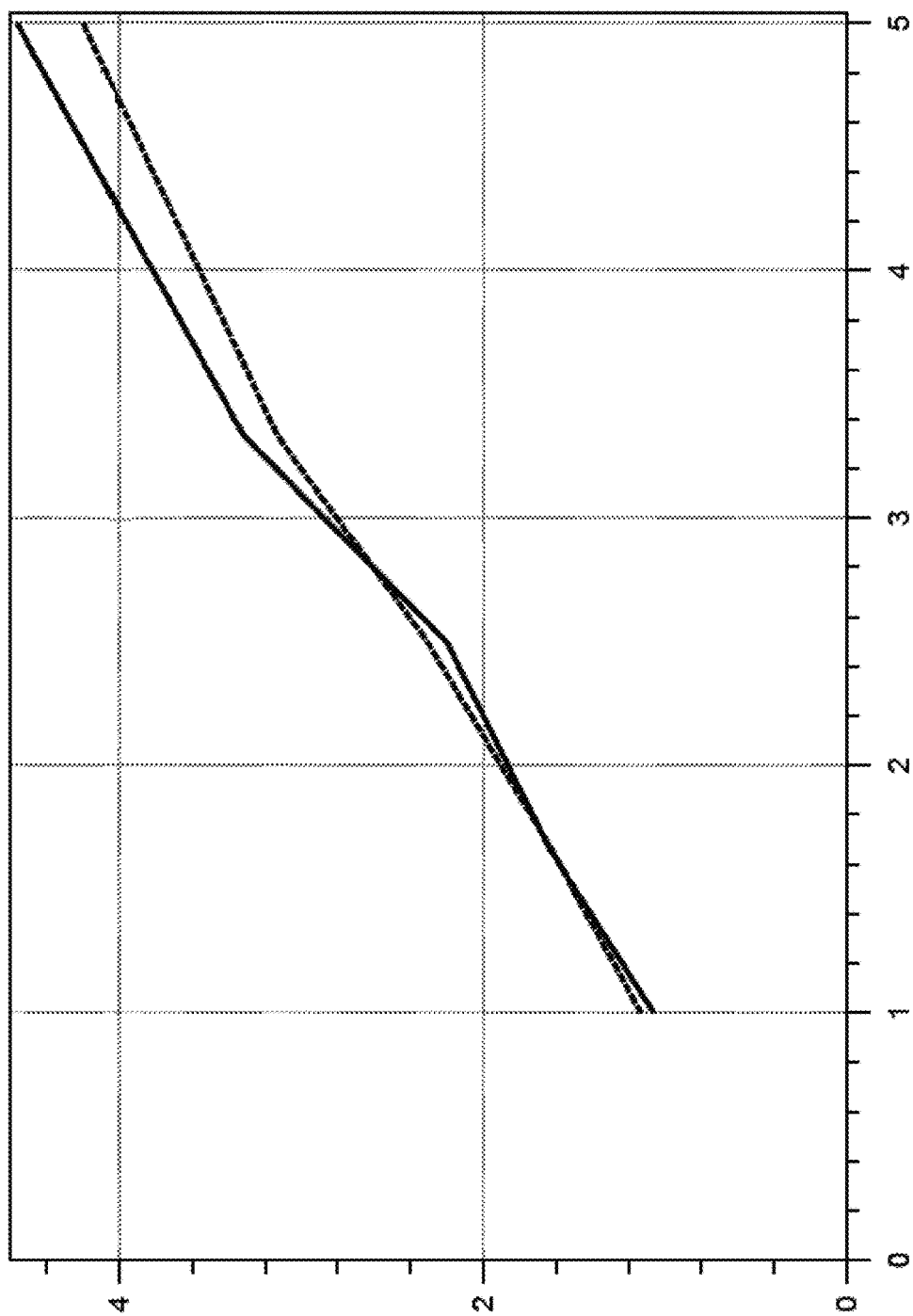
FIG. 8 shows an exemplary simulation of the relative resolution improvement such as can be achieved by the method according to the invention in comparison with a conventional reconstruction method; as a function of the ratio between standard resolution and high resolution.

FIG. 8 shows a simulation of the relative resolution improvement such as can be achieved with the method according to the invention in comparison with a conventional reconstruction method. The relative resolution improvement is plotted as a function of the ratio between standard resolution and high resolution, as in FIG. 7. As also in FIGS. 6 and 7, in FIG. 8, too, the continuous curve shows the modulation transfer function and the dashed line shows the line pair contrast. As is evident from FIGS. 7 and 8, the resolution of the 3D voxel data set generated by the method according to the invention can be increased if the ratio between standard resolution and high resolution is increased.

The examinations of the modulation transfer function and of the contrast ratio on the basis of line pairs, as illustrated in FIGS. 6 to 8, show an improvement in the resolution by the factor 4.5 in the case of a resolution ratio of 5.

Figure 9:
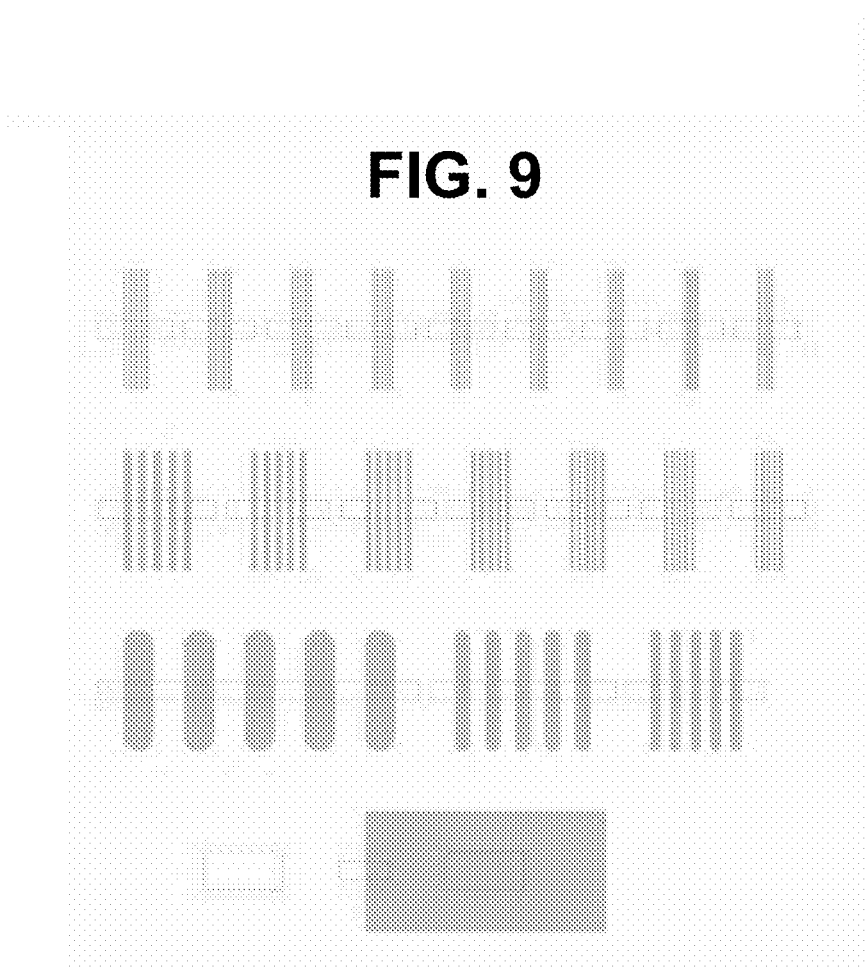
FIG. 9 shows a photographic slice image recording of the voxel data set of a test object from which exemplary CT recordings were effected.
Figure 10:
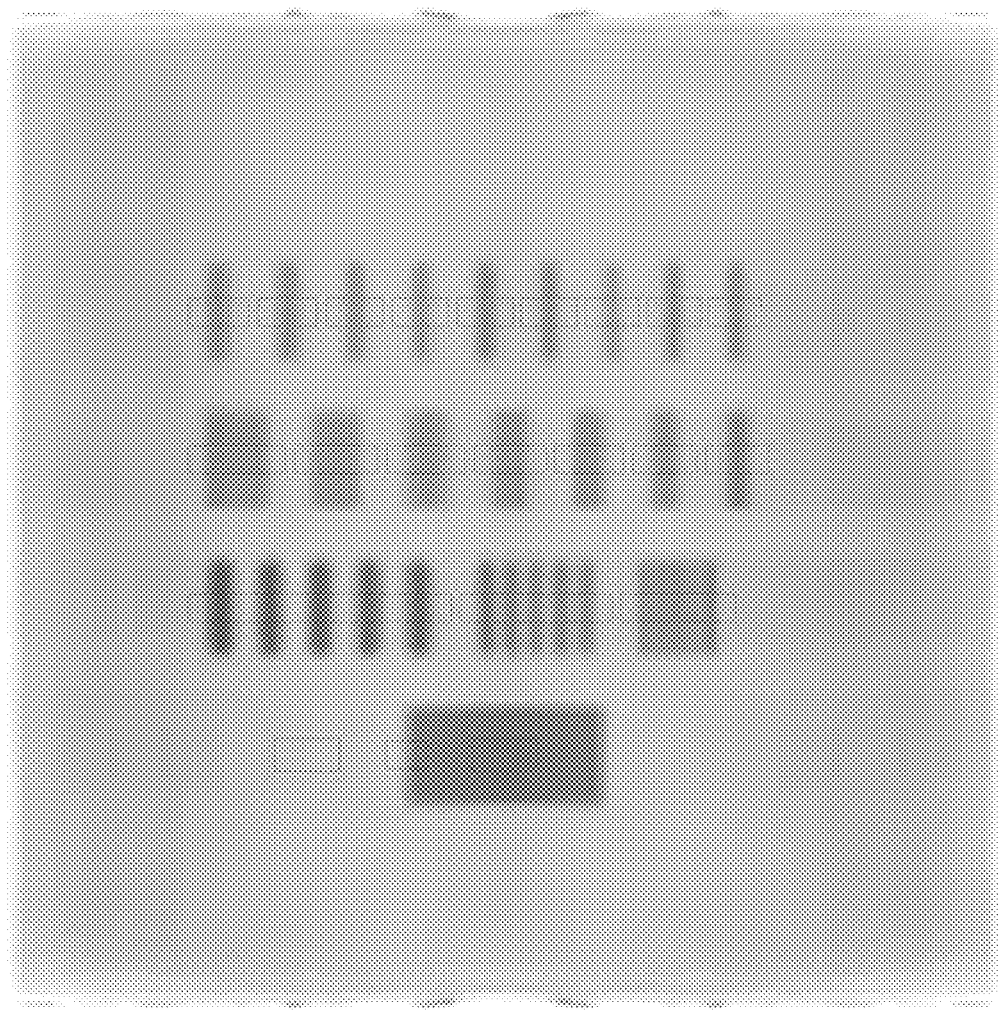
FIG. 10 shows a photographic slice image recording of the voxel data set of the test object from FIG. 9 reconstructed using a conventional method.
Figure 11:
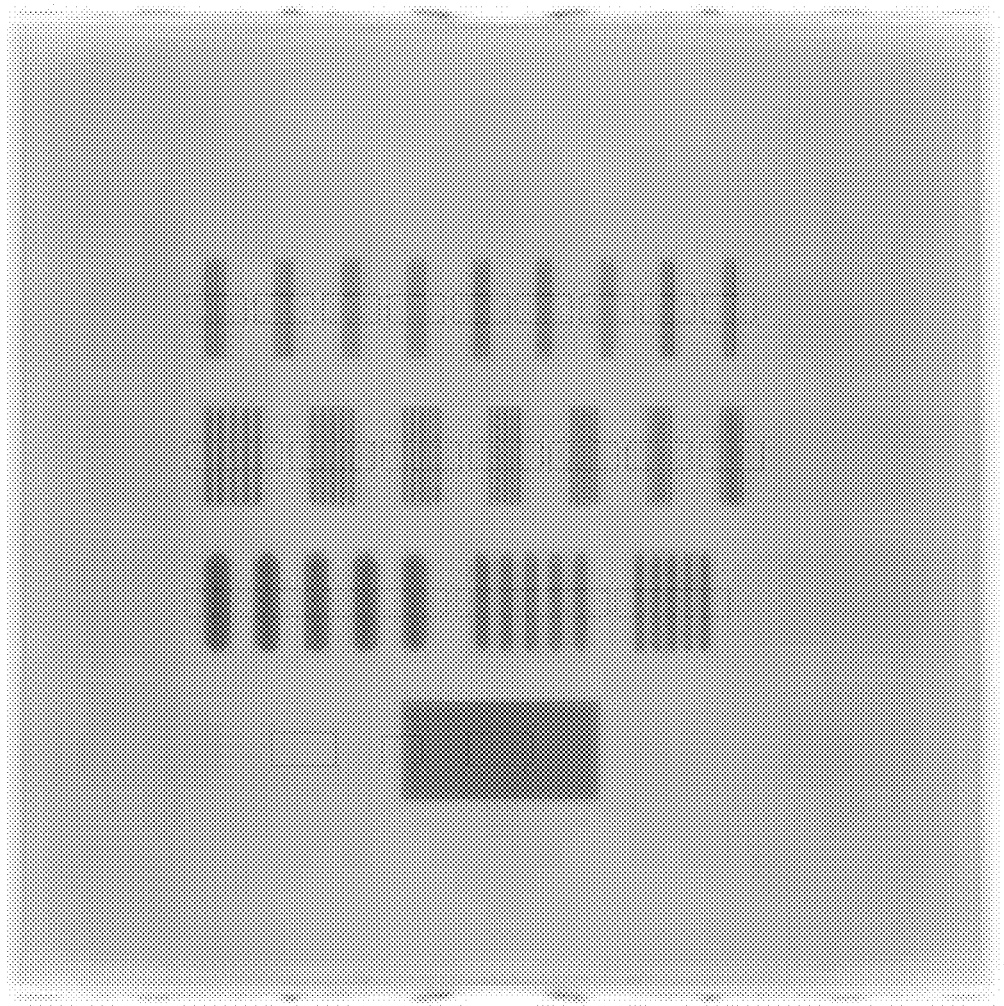
FIG. 11 shows a photographic slice image recording of the voxel data set of the test object from FIG. 9 reconstructed using the method according to the invention.

FIG. 9 shows a photograph of a slice image of a test object, i.e. of a pattern film or printed circuit board having test structures, from which exemplary CT recordings were effected. FIG. 10 shows a photograph of a slice image of the printed circuit board from FIG. 9, said slice image having been reconstructed by a conventional method, while FIG. 11 illustrates a photograph of a slice image of the printed circuit board from FIG. 9, said slice image having been reconstructed by the method according to the invention. In this case the focus-detector distance was 90 cm, the focus-object distance for generating the 3D image data set was 5 cm, the focus-object distance for acquiring the additional images or the 2D image data set was 1 cm. For the reconstruction by means of the method according to the invention, the high resolution, i.e. the resolution of the acquired additional images, was thus five times higher than the standard resolution, i.e. the resolution of the acquired images for the 3D image data set. As is evident from a comparison of FIGS. 10 and 11, the image of the pattern film in FIG. 11, reconstructed by the method according to the invention, has a visibly improved resolution and a visibly improved contrast compared with the image in FIG. 10, reconstructed by the conventional method.

TABLE 1

List of Reference Signs with Descriptors

| Reference Numeral | Description |
| --- | --- |
| 1 | Acquiring CT images from different perspectives by means of CT |
| 2 | Image sequence |
| 3 | CT reconstruction/unfiltered or filtered back projection/MLEM |
| 4 | Voxel or volume data set |
| 5 | Further processing |
| 6 | Projection |
| 10 | 3D image data set |
| 20 | 2D image data set |
| 30 | Image data reconstruction algorithm |
| 40 | High-resolution 3D voxel or volume data set |
| 50 | X-ray source |
| 60 | Object carrier |
| 70 | Detector |
| 80 | Object (e.g. printed circuit board) |
| 100 | Providing the 3D image data set and the 2D image data set |
| 101 | Initial value (e.g. 1) |
| 102 | Input data set |
| 103 | Output or result volume data set |
| 104 | Input data set divided by projection/image sequence ratio |
| 105 | Projection |
| 106 | Transposed projection |
| 107 | Transposed projection |
| 108 | Back projections |
| 109 | Normalization volume |
| 110 | Back projection divided by normalization volume/volume ratio |
| 112 | Output or result data set of the (n + 1)-th iteration step |
| 200 | Simulated modulation transfer function for a conventional CT measurement |
| 205 | Simulated line pair contrast for a conventional CT measurement |
| 210 | Simulation modulation transfer function for a CT measurement according to the present disclosure |
| 215 | Simulated line pair contrast for a CT measurement according to the present disclosure |
| 220 | Simulation modulation transfer function for a conventional CT measurement |
| 225 | Simulated line pair contrast for a conventional CT measurement |
| 230 | Simulated modulation transfer function for a CT measurement according to the present disclosure |
| 235 | Simulated line pair contrast for a CT measurement according to the present disclosure |

We claim:

1. A method for generating a high-resolution three-dimensional (3D) voxel data set of an object, the method comprising:

generating, by a computing device, a 3D image data set by arranging the object in a standard position between an X-ray source and a detector of the computing device and measuring a plurality of standard computed tomography images of the object;

generating a two-dimensional (2D) image data set by arranging the object in a high-resolution position, whose distance from the X-ray source is smaller in comparison with the standard position, and measuring one or more additional high-resolution images of the object, wherein the one or more additional high-resolution images measured for the 2D image data set have a higher resolution in comparison with the plurality of standard computed tomography images measured for the 3D image data set; and utilizing an image data reconstruction algorithm to generate, based on the generated 3D image data set and the generated 2D image data set, the 3D voxel data set of the object, wherein both the 3D image data set generated from the measured standard images in the standard position and the 2D image data set generated from the measured high-resolution images in the high-resolution position form an input data set for the image data reconstruction algorithm.

2. The method according to claim 1, wherein the generating the 3D image data set further comprises:
rotating the object by a predetermined angle.

3. The method according to claim 1, wherein the image data reconstruction algorithm is based on a maximum likelihood expectation maximization algorithm.

4. The method according to claim 1, wherein the image data reconstruction algorithm comprises a calculation of a normalization volume data set as a sum of a normalization volume data set associated with the 3D image data set and a normalization volume data set associated with the 2D image data set, wherein the normalization volume data set associated with the 2D image data set is weighted with a weighting factor.

5. The method according to claim 1, wherein the image data reconstruction algorithm comprises a calculation of a projection associated with the 3D image data set and a projection associated with the 2D image data set.

6. The method according to claim 5, further comprising:
dividing each pixel of the generated 3D image data set by a corresponding pixel of the projection associated with the 3D image data set, thereby obtaining a modulated projection associated with the 3D image data set; and
dividing each pixel of the generated 2D image data set by the corresponding pixel of the projection associated with the 2D image data set, thereby obtaining a modulated projection associated with the 2D image data set.

7. The method according to claim 6, further comprising:
calculating a back projection based on the modulated projection associated with the 3D image data set and the modulated projection associated with the 2D image data set.

8. The method according to claim 7, wherein the back projection is calculated as a sum of a first back projection associated with the 3D image data set and a first back projection associated with the 2D image data set, and wherein the first back projection associated with the 2D image data set is weighted with a weighting factor.

9. A non-transitory computer readable storage medium having a computer program product comprising machine-readable program code stored therewith that, when executed, causes a computer at least to perform:
generating a 3D image data set by arranging an object in a standard position between an X-ray source and a detector of a computing device and measuring a plurality of standard computed tomography images of the object;
generating a two-dimensional (2D) image data set by arranging the object in a high-resolution position, whose distance from the X-ray source is smaller in comparison with the standard position, and measuring one or more additional high-resolution images of the object, wherein the one or more additional high-resolution images measured for the 2D image data set have a higher resolution in comparison with the plurality of standard computed tomography images measured for the 3D image data set; and
utilizing an image data reconstruction algorithm to generate, based on the generated 3D image data set and the generated 2D image data set, a 3D voxel data set of the object, wherein both the 3D image data set generated from the measured standard images in the standard position and the 2D image data set generated from the measured high-resolution images in the high-resolution position form an input data set for the image data reconstruction algorithm.

10. The computer program product recited in claim 9, wherein the machine-readable program code, when executed, further causes the computer to:
rotate the object by a predetermined angle.

11. The computer program product recited in claim 9, wherein the image data reconstruction algorithm is based on a maximum likelihood expectation maximization algorithm.

12. The computer program product recited in claim 9, wherein the image data reconstruction algorithm comprises a calculation of a normalization volume data set as a sum of a normalization volume data set associated with the 3D image data set and a normalization volume data set associated with the 2D image data set, wherein the normalization volume data set associated with the 2D image data set is weighted with a weighting factor.

13. The computer program product recited in claim 9, wherein the image data reconstruction algorithm comprises a calculation of a projection associated with the 3D image data set and a projection associated with the 2D image data set.

14. The computer program product recited in claim 13, wherein the machine-readable program code, when executed, further causes the computer to:
divide each pixel of the generated 3D image data set by a corresponding pixel of the projection associated with the 3D image data set, thereby obtaining a modulated projection associated with the 3D image data set; and
divide each pixel of the generated 2D image data set by the corresponding pixel of the projection associated with the 2D image data set, thereby obtaining a modulated projection associated with the 2D image data set.

15. The computer program product recited in claim 14, wherein the machine-readable program code, when executed, further causes the computer to:
calculate a back projection based on the modulated projection associated with the 3D image data set and the modulated projection associated with the 2D image data set.

16. The computer program product recited in claim 15, wherein the back projection is calculated as a sum of a first back projection associated with the 3D image data set and a first back projection associated with the 2D image data set, and wherein the first back projection associated with the 2D image data set is weighted with a weighting factor.

17. The method according to claim 1, wherein the generating the 2D image data set further comprises:
displacing the object in a plane arranged perpendicular to a longitudinal axis of the computing device.

18. The computer program product recited in claim 9, wherein the generating the 2D image data set further comprises:
displacing the object in a plane arranged perpendicular to a longitudinal axis of the computing device.

* * * * *